United States Patent [19]

Grantham

[11] Patent Number: 4,879,627
[45] Date of Patent: Nov. 7, 1989

[54] DIFFERENTIAL CAPACITIVE PRESSURE SENSOR WITH OVER-PRESSURE PROTECTION

[75] Inventor: Daniel H. Grantham, Glastonbury, Conn.

[73] Assignee: United Technologies Corporation, Hartford, Conn.

[21] Appl. No.: 292,281

[22] Filed: Dec. 30, 1988

[51] Int. Cl.[4] .............................................. G01L 9/12
[52] U.S. Cl. ..................................... 361/283; 73/718
[58] Field of Search .................... 73/718, 724; 361/283

[56] References Cited

U.S. PATENT DOCUMENTS

| | | | |
|---|---|---|---|
| 2,725,501 | 11/1955 | Sihvonen | 361/283 X |
| 3,232,114 | 2/1966 | Ferran | 73/718 |
| 3,965,746 | 6/1976 | Rabek | 73/718 |
| 4,257,274 | 5/1981 | Shimada et al. | 73/718 |
| 4,735,098 | 4/1988 | Kavli et al. | 73/718 |

Primary Examiner—Donald A. Griffin

[57] ABSTRACT

A pressure sensor (10) having over-protection for use in environments which subject the sensor to large pressure overloads, such as may occur when such sensor is exposed to jet and automobile engine backfires, explosive gas furnace ignitions and similar high pressure events. Essentially two capacitive sensors are bonded together, diaphragm-to-diaphragm, with the diaphragms (111A/111B) spaced but juxtaposed and forming a closed, reference cavity chamber (114) between them, along with a central, side, wall spacer (116C). The capacitance variation with differential pressure is measured between the two diaphrams and with reference to their respective bases (112A/112B). Each of the diaphragms preferably is provided with a center bearing or stops (115A/115B) for accepting the load when overpressured. When in contact at the center, the stiffness of the combined pair of diaphragms is increased several fold over that of a single diaphragm. Furthermore, providing for bottoming stops for the combination on either side of the sensor prevents deflection to the breaking point, because the presence of the opposed bottoming stops stiffens its respective diaphragms.

14 Claims, 1 Drawing Sheet

DIFFERENTIAL CAPACITIVE PRESSURE SENSOR WITH OVER-PRESSURE PROTECTION

DESCRIPTION

1. Technical Field

This invention relates to pressure sensors utilizing capacitance variations to sense pressure variations, and more particularly the present invention relates to silicon-on-silicon pressure sensor designs which employ a silicon diaphragm, the movement of which due to changes in pressure varies the capacitance of the sensor and thus provides an output representative of the applied pressure. Even more particularly, the present invention relates to the protection of such sensors which are subject to large pressure overloads, such as may occur, for example, when such sensors are exposed to jet and automobile engine backfires, explosive gas furnace ignitions and similar high pressure events.

2. Background Art

Capacitive pressure sensors are well known and are employed in, among many other applications, commercial and aerospace applications.

Many applications for such capacitive pressure sensors require that the sensors be extremely small, for example, of the order of eight millimeters by eight millimeters (8 mm×8 mm). Such small size, silicon capacitive pressure transducers are known in the art. For example, U.S. Patent No. 3,634,727 to Polye discloses one type in which a pair of centrally apertured, conductive silicon plates are joined together with an eutectic metal bond, such that the silicon disc plates flex with applied pressure, changing the capacitance of the aperture interstice and providing a capacitive-type signal manifestation of pressure magnitude. This form of pressure transducer thus relies on the pressure-induced deflection of a thin diaphragm, in which the diaphragm deflection as a function of fluid pressure causes a variation in the distance between a pair of surfaces which effectively form the plates of a variable capacitor. Other examples of such silicon pressure sensors or transducers are included in the U.S. patents listed below.

Some exemplary, prior art, U.S. patents in the field of capacitive pressure sensors or transducers, owned by the assignee hereof, are listed below:

| U.S. Pat. No. | Title | Inventors | Issue Date |
|---|---|---|---|
| 4,530,029 | Capacitive Pressure Sensor With Low Parasitic Capacitance | C. D. Beristain | 07/16/85 |
| 4,517,622 | Capacitive Pressure Transducer Signal Conditioning Circuit | B. Male | 05/14/85 |
| 4,513,348 | Low Parasitic Capacitance Pressure Transducer and Etch Stop Method | D. H. Grantham | 04/23/85 |
| 4,467,394 | Three Plate Silicon-Glass-Silicon Capacitive Pressure Transducer | D. H. Grantham J. L. Swindal | 08/21/84 |
| 4,463,336 | Ultra-Thin Microelectronic Pressure Sensors | J. F. Black T. W. Grudkowski A. J. DeMaria | 07/31/81 |
| 4,415,948 | Electrostatic Bonded, Silicon Capacitive Pressure Transducer | D. H. Grantham J. L. Swindal | 11/15/83 |
| 4,405,970 | Silicon-Glass-Silicon Capacitive Pressure Transducer | J. L. Swindal D. H. | 09/20/83 |
| | Grantham | | |

Measuring small differential pressures is an important problem in commercial and aerospace applications. However, capacitive sensing of small differential pressures to provide a frequency output in environments, which subject the sensor to large pressure overloads, is especially difficult and vital. For example, when such a sensor is exposed in its application to large pressure overloads, such as, for example, may occur when it is exposed to jet and automobile engine backfires, explosive gas furnace ignitions or similar events, special designs are necessary.

The present invention address and resolves this over-pressure problem.

DISCLOSURE OF INVENTION

Thus, a basic object of the present invention is to provide a differential capacitive sensor with over-pressure protection, so that it can survive use in applications which subject it to large pressure overloads.

The pressure differential capacitive sensor of the present invention is small, rugged, sensitive to very low differential pressures, and can be constructed to give linear outputs of frequency versus pressure, as well as be free of drift and instabilities associated with glass dielectrics, and the like, if so desired. However, in this invention, the sensor is primarily configured to resist relatively large over-pressures without damage.

The use of the configuration described in this disclosure generally requires that the sensor be designed for each pressure range of interest. For example, the closed reference cavity formed between the appropriate silicon layers may be completely evacuated. In this instance the device was designed to measure very small differential pressures near absolute zero pressure through the use of very thin diaphragms [for example, one thousands (0.001") of an inch thick for a one tenth (0.1 psi) pound per square inch maximum pressure range]. Resolution of a thousandth (0.001) psi differential is, thus, possible with the use of the oscillator circuits described, for example, in assignee's U.S. Pat. No. 4,517,622 of Male. This device will, however, not be useful for measurements of such small differentials in the regime of several psi absolute, since the much larger applied pressures will cause the diaphragms to contact each other and produce no further useful capacitive changes.

Diaphragms of, for example, six thousandths (0.006") of an inch thickness, which have proven useful in the absolute measurements around fifteen (15) psi can be used with sophisticated circuitry, at some sacrifice in sensitivity. The sensitivity to small differentials in the range of high pressure ambients can be retained, if the reference cavity is not evacuated but rather is sealed with a reference pressure in the cavity, which falls in the range of ambient pressure to be measured.

A universal device suitable for any ambient pressure range can be made by providing a means for changing the pressure inside the cavity, such as by etching an access channel in the glass spacer wall between the two diaphragms and attaching a pressurizing port with a valve in the line. This approach permits the same thin diaphragm for measuring pressure changes of, for example, one tenth (0.1) psi to be used over a wide range of ambient pressures, so long as the nominal ambient is applied to the cavity. The diaphragms preferably have the same stiffness, that is, have the same response functions with respect to pressure, in order to avoid extensive calibrations. However, the calibrations can be inexpensively made with the help of, for example, small computer systems, if so desired.

The invention described herein is a capacitive device—essentially two capacitive sensors, as embodied to some degree in previous designs—but which are bonded together, diaphragm-toward-diaphragm, spaced but juxtaposed.

The capacitance variation with differential pressure is measured between the two diaphragms and between either diaphragm and its respective, associated base. Each of the diaphragms preferably is provided with a center bearing or stop(s) for accepting the load when over-pressured, thus further limiting the amount of allowed diaphragm movement.

When in contact at the center, the stiffness of the combined pair of diaphragms is increased several fold over that of a single diaphragm. Furthermore, providing for central bearings or bottoming stops for the combination on either side of the sensor prevents deflection of the affected diaphragm to the breaking point, because the presence of the opposed bottoming stops further stiffens its respective diaphragm.

In use, the differential pressure sensor of the invention could be used, for example, on one side to sense the exhaust pressure and on the other side to sense the ambient pressure to be able to, for example, compare the two. With the back-up strength of the other diaphragm and the central stop(s), large pressure overloads, such as those that occur in jet-engine backfires, automobile engine backfires, explosive gas furnace ignitions, and similar high pressure events, can be survived by the device of the present invention.

The foregoing and other features and advantages of the present invention will become more apparent from the following further description and drawings, in which like reference numbers are used across the figures to denote common or analogous elements or structures.

BEST MODE FOR CARRYING OUT THE INVENTION

Figure 1:
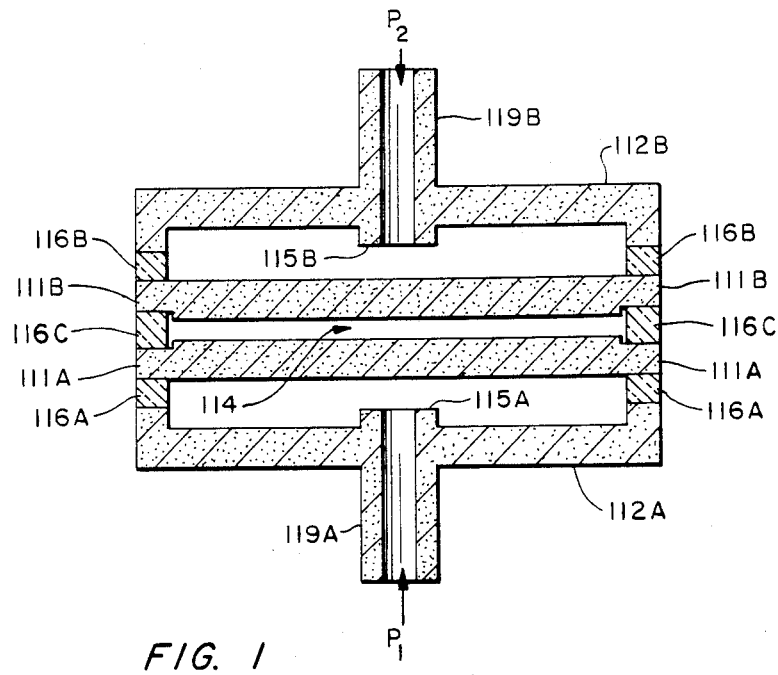
FIG. 1 is a side, simplified, cross-sectional view of an exemplary, differential pressure, silicon-on-silicon capacitive sensor having two, opposed diaphragms with centrally located sets of stops on opposite sides of the diaphragms, one set of stops for each diaphragm, all in accordance with the over-pressure protection principles of the present invention.
Figure 1A:
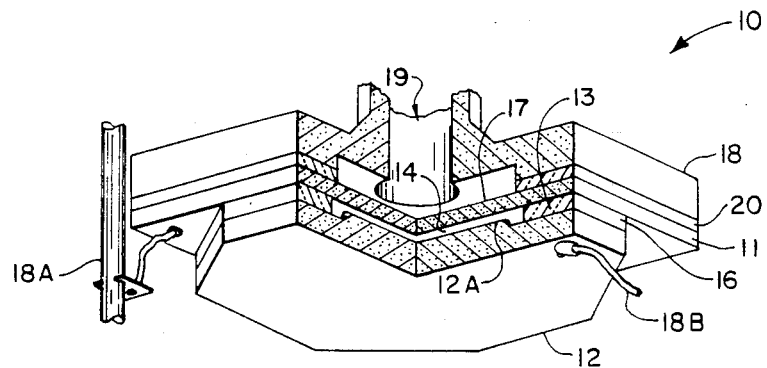
FIG. 1A is a perspective, partially cut-away view of an exemplary silicon-on-silicon capacitive single pressure sensor of the prior art, not a differential pressure sensor, the discussion of which serves as general background information to better understand the general sensing operation of each side of the differential pressure sensor of the present invention.

Single Sensor Structure (Prior Art—FIG. 1A)

For a better understanding of the general structure and operational characteristics of each side of the differential pressure sensor of the present invention, a simplified single sensor of the prior art will be discussed with reference to FIG. 1A for general background information.

In the exemplary prior art, silicon-glass-silicon single pressure sensor design of the sandwich type of FIG. 1A, a dielectric wall spacer 16 is located between a silicon diaphragm 11 and a silicon base 12. The dielectric wall spacer is typically made of borosilicate glass.

As can be seen in FIGS. 1A, the exemplary prior art silicon-on-silicon pressure sensor or transducer 10 typically is generally square in its exterior configuration but often at least generally and preferably is circular or cylindrical in shape for its inner, operative substructure. The sensor 10 includes an upper, conductive, square, flexible, appropriately doped, silicon diaphragm 11 and a lower or bottom, conductive, appropriately doped, silicon base or substrate 12 with a non-conductive dielectric layer and spacer 13 (made of, for example, borosilicate glass) between them, a closed, evacuated, hermetically sealed, reference cavity, chamber or interstice 14 being formed between the two silicon layers 11, 12. The chamber 14 is typically at a zero vacuum or can be sealed at a higher reference pressure, at which reference level the diaphragm 11 is parallel to the silicon substrate 12, with typically a two micrometer spacing between the two.

It should be understood that the simplified drawings hereof for practical purposes of illustration are not at all to relative scale, as the glass wall or spacer 13/16 is only typically nine micrometers high, in contrast to the thicknesses of the silicon layers 11 and 12, which typically are eight thousandths (0.008") of an inch and fifty thousandths (0.050") inches thick, respectively, for an exemplary fifty (50 psi) pounds per square inch pressure measuring unit.

A centrally located, typically circular pedestal or mesa 12A extends into the typically generally cylindrical, closed chamber 14 with a thin, insulating layer of glass 13A (not shown in FIG. 1A) covering the top of the mesa. Due to the thinness of the layer 13A, typically only a half of a micrometer, which is usually deposited after the relatively high wall 16 (typically nine micrometers), it typically plays no significant role in the parasitic capacitance of the sensor 10.

As the external ambient pressure on the outside of the sensor 10 varies, the diaphragm 11 flexes downwardly, causing the spacing between the silicon layers 11 and 12, serving as capacitive plates, to change and lessen, in turn changing the capacitance of the sensor. This change in capacitance as a result of a change in the exterior pressure on the exterior surface or upper-side 17 of the diaphragm 11 is used as a measure of the pressure and its changes.

Conductors or electrodes 18A and 18B to the silicon layers 11 and 12 are included for connecting the transducer or sensor 10 into an appropriate circuit, many of which are known to the art, which measures its changing capacitance as a function of the pressure. The varying pressure on the exterior, sensing surface 17 of the elastic silicon diaphragm 11, causing the diaphragm to flex and relatively unflex, changes the value of the interstitial capacitance between the diaphragm and the electrode to the lower silicon substrate 12, which transduces the applied pressure to a measurable electronic signal. Typically, as noted above, there is about an exemplary two micrometer gap between the inner, lower, underside surface of the diaphragm 11 and the top or upper-side of the mesa 12A, when the sensor is at its zero or reference pressure, to allow room for the diaphragm to flex inwardly toward the mesa 12A, as the pressure increases.

The wall(s) 16 might typically have a horizontal, lateral or radial thickness of, for example, thirty-six thousandths (0.036") of an inch with a height of, for example, nine (9) micrometers, while the separately applied, insulating, mesa layer of glass is only about a half of micrometer thick. The mesa 12A extends up from the main surface of the silicon substrate 12 an exemplary six and a half micrometers, while having an exemplary diameter of one hundred and fifty thousandths (0.150") of an inch.

The silicon diaphragm 11 and the silicon base 12 may typically be square [with corners removed for the purpose of providing access for electrical contacts to the layer(s), as illustrated], having a horizontal length of an exemplary two hundred and sixty thousandths (0.260") of an inch on an edge, while the spacer wall 16 can have an inner diameter of an exemplary one hundred and ninety thousandths (0.190") of an inch. The outer, side surface of the wall spacer 16 can either follow the basic square configuration of the silicon layers 11/12 or have an outer circular configuration.

A transition piece 18 is bonded through an exemplary glass layer 20 to the upper, exterior surface 17 of the diaphragm 11 and includes a pressure port 19, through which the pressure to be sensed is communicated to the diaphragm. In turn the sensor 10 is appropriately mounted for use in the desired application.

The differential sensor 110 of the present invention, in essence combines in part two such sensors 10, as will be more fully understood below in connection with the discussion of FIG. 1.

Pressure Differential Sensor (FIG. 1)

As can be seen in FIG. 1, the exemplary capacitive, silicon-on-silicon, differential pressure sensor 110 of the present invention can be basically cylindrical in shape and includes two, independent, opposed, elastic, flexible, conductive, silicon diaphragms 111A and 111B, which are affixed at their peripheral edges by, for example, electrostatic bonds, with each having its own conductive silicon base and combined pressure port 112A/119A and 112B/119B, respectively, at least the base portions of which are likewise made of conductive silicon. A closed, evacuated chamber 114, serving as a reference cavity, is formed between the two diaphragms 111A and 111B, with the spacing between them being an exemplary two micrometers when the exterior pressures at the ports 119A and 119B are at zero (P1=P2=0), namely at a complete vacuum, or at some other designed reference pressure.

Three, longitudinally spaced, annular, glass, side, support walls 116A, 116B and 116C complete up the basic, pressure differential sensor structure, and each can have an exemplary height or longitudinal thickness of six micrometers. The central glass side wall 116C with the diaphragms 111A and 111B form the closed, hermetically sealed, central reference cavity or chamber 114.

Conductors or electrodes (not illustrated for simplicity purposes in FIG. 1 but similar to those 18A and 18B of FIG. 1A) to the conductive silicon diaphragms 111A and 111B and to the conductive silicon bases 112A and 112B are included for connecting the transducer or sensor 110 into a circuit, which measures its changing capacitances as an inverse function of the pressures P1/P2 at ports 119A and 119B, respectively. The varying pressure(s) P1/P2 on the exterior, sensing surfaces 117A and 117B of the silicon diaphragms 111A and 111B, respectively, communicated through their respective pressure ports 119A and 119B causing the respective diaphragm(s) to flex, changes the value of the capacitance between the diaphragm and between the flexed diaphragm(s) and its/their respective silicon base(s) 112A/112B, which transduces the applied pressure to measurable electronic signals. The capacitance variation with differential pressure can thus be measured between the two diaphragms 111A and 111B and between either diaphragm 111A/111B and its respective, associated base 112A/112B.

When one of the diaphragms 111A/111B is exposed to an over-pressure through the exterior ports 119A/119B, respectively, such as may occur, for example, when the sensor 110 is exposed to a jet or an automobile engine backfire, an explosive gas furnace ignition or a similar, sudden, high pressure event, the diaphragm deflects until it touches the other diaphragm, which lends an extra stiffness to the combination significantly in excess of a factor of two (2).

Centrally located stops or central bearings 115A and 115B are located in the bases 112A and 112B, respectively, on each side of the combined diaphragms 111A and 111B at a spacing at or slightly in excess of the cavity spacing. This provides additional stiffening of the diaphragm pair, so that they can sustain pressures much greater than the nominal range for which the diaphragm thickness is chosen.

The silicon bases or pressure ports 112A and 112B may be shaped to produce the stops 115A and 115B by electric discharge machining, etching or some other suitable method. The glass layers 116A–C may be of borosilicate glass of the commonly used thicknesses [for example, about (6) six to about nine (9) micrometers] employed in electrostatic bonding.

The diaphragms 111A and 111B are shown as hinged devices to provide a gap between them of the order of, for example, two (2) micrometers, although it is not required that the center of the diaphragms be rigid.

The main body or plateau areas 111AA and 111BA on the diaphragms 111A and 111B, respectively, can be formed, for example, by repeated selective oxidation of the silicon with etching of the oxide between oxidation steps, by controlled etching of the silicon or by forming composite structures by bonding silicon of the appropriate dimensions to the respective diaphragm at its plateau area.

Exemplary dimensions for the differential pressure sensor 110, not previously detailed with respect to the exemplary single pressure sensor 10 above or otherwise provided above, are outlined below.

The inner diameter of the generally cylindrical sensor 110 can be, for example, approximately one hundred and ninety thousands (0.190") of an inch in diameter, with the inner diameter of the pressure port tube 119A/119B being an exemplary seventy-five thousandths (0.075) of an inch. The central stops 115A/115B can extend inwardly past their respective bases 112A/112B an exemplary five thousandths (0.005") of an inch, with an outer diameter of an exemplary one hundred and twenty-five thousandths (0.125") of an inch. As noted above the inner-most tip of the stops or bearing could have a separation distance from the diaphragms of an exemplary two micrometers or so. These dimensions, of course, are merely exemplary and subject to great variation.

It should be understood that in using the terms "above" or "below", "down" or "up", or "vertically" or "horizontally," these terms are being used in an exemplary relative sense, as presented in the drawings hereof. Thus, for example, in a particular application the silicon substrate could in fact, of course, be below the diaphragm and, rather than the silicon layers being horizontally disposed with the wall spacer being vertical, the silicon layers could be vertically disposed or disposed at an acute angle to the horizontal, with the dielectric layer appropriately positioned relative to them.

Although this invention has been shown and described with respect to detailed, exemplary embodiments thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

I claim:

1. A differential capacitive pressure sensor of the silicon-on-silicon type having over-pressure protection, comprising:
   a first conductive silicon base having a pressure port through it to an exterior area whose pressure variation is to be sensed;
   a first conductive silicon flexible, elastic diaphragm having an exterior side exposed to said pressure port of said first base, said diaphragm being capable of flexing movement due to changes in pressure on its exterior side; and
   a first non-conductive spacing wall between said first silicon base and said first silicon diaphragm, said first spacing wall providing a peripheral wall extending between and joining said first silicon base and said first silicon diaphragm;
   a second conductive silicon base having a pressure port through it to an exterior area whose pressure variation is to be sensed;
   a second conductive silicon flexible, elastic diaphragm having an exterior side exposed to said pressure port of said second base, said diaphragm being capable of flexing movement due to changes in pressure on its exterior side; and
   a second non-conductive spacing wall between said second silicon base and said second silicon diaphragm, said second spacing wall providing a peripheral wall extending between and joining said second silicon base and said second silicon diaphragm; and
   a centrally located, third, non-conductive spacing wall located between said first and said second diaphragms joining them together in spaced, parallel, juxtaposed relationship; said third spacing wall and said first and second diaphragms forming an evacuated, reference cavity chamber between them; each said diaphragm backing the other said diaphragm up; the flexing movement of each of said silicon diaphragm due to the changes in pressure on its exterior side through its respective pressure port causing the capacitance of the sensor to vary; the spacing between said two diaphragms being small, the backing presence of one diaphragm to the other diaphragm limiting the amount of deflection of said one diaphragm, lending extra stiffness and resistance to further flexing to said one diaphragm when they come into contact, said other diaphragm thereby providing said one diaphragm with over-pressure protection.

2. The differential capacitive pressure sensor of claim 1, wherein there is further included at least one centrally located stop located adjacent to the exterior surface of at least said other diaphragm, further limiting the amount of deflection of said one diaphragm.

3. The differential capacitive pressure sensor of claim 2, wherein said stop is separated from its respective diaphragm a distance greater than the distance separating the said diaphragms.

4. The differential capacitive pressure sensor of claim 1, wherein said sensor is basically cylindrically shaped.

5. The differential capacitive pressure sensor of claim 4, wherein said three spacing walls are annular in shape.

6. The differential capacitive pressure sensor of claim 1, wherein electrical connections are separately provided on said diaphragms and said bases, the changing capacitance being electrically measured between said diaphragms and between at least one of said diaphragms and its respective base.

7. The differential capacitive pressure sensor of claim 1, wherein said diaphragms have a spacing of about two micrometers when said reference chamber is at its reference level.

8. The differential capacitive pressure sensor of claim 1, wherein said sensor is included within an engine exhaust system, one of said diaphragms being exposed to the exhaust gas pressure of said system and the other being exposed to the ambient.

9. The differential capacitive pressure sensor of claim 8, wherein said spacing between said diaphragms is sufficiently small to cause contact between said two diaphragms when an exhaust back-fire is seen by the diaphragm exposed to the exhaust gas pressure of said engine.

10. A method of providing over-pressure protection to a capacitive, silicon-on-silicon pressure sensor, which sensor includes
   a conductive silicon base having a pressure port through it to an exterior area whose pressure variation is to be sensed;
   a conductive silicon diaphragm having an exterior side, said diaphragm being capable of flexing movement due to changes in pressure on its exterior side; and
   a non-conductive spacing wall extending between and joining said silicon base and said silicon diaphragm; an evacuated reference cavity chamber being formed in association with said silicon diaphragm on its side opposite to said exterior side; the flexing movement of said silicon diaphragm due to the changes in pressure on its exterior side causing the capacitance of the sensor to vary;
   comprising the following step(s) providing:
   a second conductive silicon base having a pressure port through it to an exterior area whose pressure variation is to be sensed;
   a second conductive silicon diaphragm having an exterior side exposed to said pressure port of said second base, said diaphragm being capable of flexing movement due to changes in pressure on its exterior side; and
   a second non-conductive spacing wall between said second silicon base and said second silicon diaphragm, said second spacing wall providing a peripheral wall extending between and joining said second silicon base and said second silicon diaphragm; and a centrally located, third, non-conductive spacing wall located between the first and said second diaphragms joining them together in spaced, parallel, juxtaposed relationship; said third spacing wall and the first and second diaphragms forming an evacuated, reference cavity chamber between them;

allowing each of said diaphragm to back the other said diaphragm up; the flexing movement of each of said silicon diaphragm due to the changes in pressure on its exterior side through its respective pressure port causing the capacitance of the sensor to vary; the spacing between said two diaphragms being small, the backing presence of one diaphragm to the other diaphragm limiting the amount of deflection of said one diaphragm, lending extra stiffness to said one diaphragm when they come into contact, providing said one diaphragm with over-pressure protection.

11. The method of claim 10, wherein there is included the following step(s):

measuring the changing capacitance between said two diaphragms and at least one of said diaphragm and its respective base.

12. The method of claim 10, wherein there is included the following step(s):

providing at least one centrally located stop located adjacent to the exterior surface of at least said other diaphragm, further limiting the amount of deflection of said one diaphragm.

13. The method of claim 10, wherein there is further included the following step(s):

locating the sensor within an engine exhaust system, one of said diaphragms being exposed to the exhaust gas pressure of said system and the other being exposed to the ambient.

14. The method of claim 13, wherein there is further included the following step(s):

making the spacing between said diaphragms sufficiently small to cause contact between said two diaphragms when an exhaust back-fire is seen by the diaphragm exposed to the exhaust gas pressure of said engine.

* * * * *